R. W. THOMSON.
WHEEL FOR SELF MOVING CARRIAGES.
No. 96,635. Patented Nov. 9, 1869.
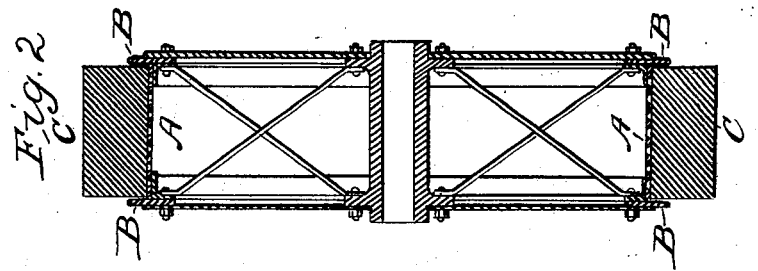
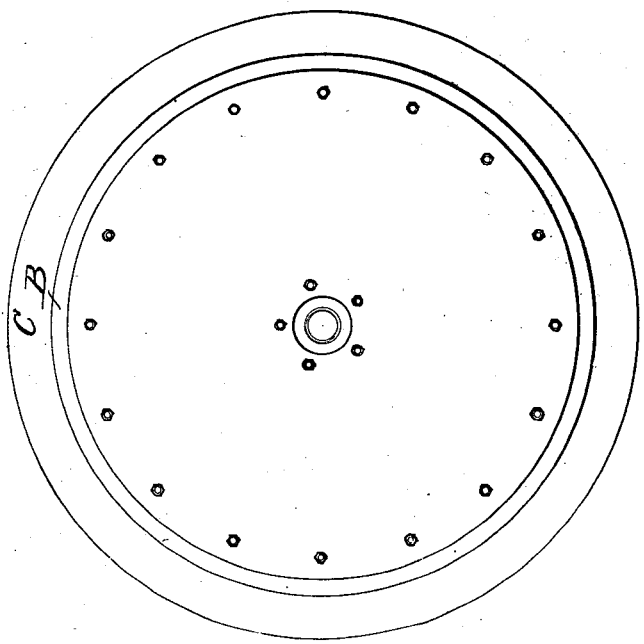
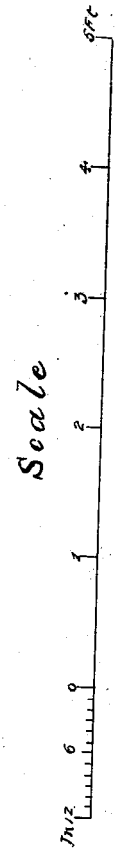
Witnesses
G. A. Smith
W. L. DuBois
Inventor
Robert William Thomson
By Alex. A. C. Kbuackur & Co
his Attorneys

United States Patent Office.

ROBERT WILLIAM THOMSON, OF EDINBURGH, GREAT BRITAIN.

Letters Patent No. 96,635, dated November 9, 1869; patented in England, April 21, 1868.

IMPROVEMENT IN WHEELS FOR SELF-MOVING CARRIAGES.

The Schedule referred to in these Letters Patent and making part of the same.

*To all whom it may concern:*

Be it known that I, ROBERT WILLIAM THOMSON, of Edinburgh, in the county of Mid Lothian, Kingdom of Great Britain and Ireland, have invented a new and useful Improvement in Wheels for Self-Moving Carriages, for which Letters Patent were granted in Great Britain, on the 21st day of April, 1868, No. 2,980; and I do hereby declare the following to be a full, clear, and exact description of the same, reference being had to the accompanying drawing, and to the reference letters marked thereon.

The object of my invention is, by the application of an improved wheel, to obtain a self-moving carriage, more suitable than any hitherto in use, for drawing loads, or travelling otherwise on common roads.

It is well known that the principal difficulties hitherto met with in such carriages have related to the action of the wheels on the road. The adhesion necessary for traction on comparatively hard roads has not been obtained without an objectionable tendency to injure the roads; whilst on soft roads, the ordinary wheels sink into the surface, whereby the resistance to progression is greatly increased.

My invention consists in constructing the wheels with external tires of vulcanized rubber, whereby the difficulties referred to are overcome.

I am aware that comparatively thin bands of vulcanized rubber have, for several years, been applied as tires to wheels of light carriages, but such carriages have not been self-moving, and the rubber tires have been applied to them mainly to prevent noise; whereas, by my present invention, I apply comparatively thick tires, and for new purposes, namely, to obtain increased adhesion, and to present an increased bearing-surface, so as not to sink too deeply into soft roads.

My improved rubber tire presents a larger bearing-surface than a metal tire of the same dimensions, because the weight of the carriage compresses the part of the tire in contact with the road, and thereby causes a larger portion of the circumference to be in contact. This increased contact-surface prevents sinking, and, combined with the elastic nature of the material, secures the best possible adhesion; in consequence of which, the carriage may be propelled over bad roads with less power than that required with rigid tires.

And, in order that others skilled in the art may be enabled to make and use my invention, I will proceed to describe my improved wheel.

Figure 1 is a face view, and

Figure 2 is a section, as taken in a plane through the axis of the wheel.

The body or frame of the wheel is represented as built up or constructed of wrought-iron plates strengthened by angle-iron and by diagonal stays; but my invention is equally applicable to wheels constructed otherwise.

The wheel is formed with a cylindrical rim or shell, A, and with flanges, B B, the space between such flanges constituting a broad, shallow circumferential groove.

The rubber tire C is moulded and vulcanized or curved in the form of a complete ring, with its inner cylindrical surface a little smaller in diameter than the cylindrical surface A of the wheel, and it is stretched to get it into its place on the wheel-surface A. The elastic tension due to its being stretched, assists in keeping the rubber tire C in its place, and the flanges B also prevent its displacement.

The rim or shell A has holes punched in it, as a further precaution against the displacement of the tire C; or the same end may be attained by making the rim with transverse corrugations, the inside surface of the tire C being, however, kept cylindrical.

The width of the tire C is made a little less than the width between the flanges B of the wheel, and its thickness radially is such that it projects a few inches beyond the flanges B, which, consequently, do not touch the ground.

My improved tires admit of the ordinary springs being dispensed with, and, consequently, of the driving-power being applied to the wheels by means of simpler gearing or mechanism than has hitherto been found requisite.

Steam-carriages, with my improved wheels, may pass over grass-land, and even over plowed land, with very little sinking into the soil, thus enabling such carriages, when used for agricultural purposes, to travel over farm-lands with much less difficulty than is experienced with steam-carriages having rigidly-tired wheels.

Having thus described my said invention, I have to state that I do not claim the applying of rubber tires to the wheels of carriages of all kinds; but

What I do claim as my invention, and desire to secure by Letters Patent, is—

The constructing of the wheels of self-moving carriages with rubber tires, substantially in the manner and for the purposes hereinbefore described.

In testimony whereof, I sign my name to this specification, in the presence of two subscribing witnesses.

R. W. THOMSON.

Witnesses:
 EDMUND HUNT, *Glasgow*,
 ALEXR. TEMPLETON, *Glasgow*.